United States Patent [19]  [11]  4,145,311
von Halasz et al.  [45]  Mar. 20, 1979

[54] PROCESS FOR REACTIVATING FLUORINATION CATALYSTS

[75] Inventors: Sigmar P. von Halasz, Kelkheim; Jürgen Korinth, Hofheim am Taunus, both of Fed. Rep. of Germany

[73] Assignee: Hoechst Aktiengesellschaft, Frankfurt am Main, Fed. Rep. of Germany

[21] Appl. No.: 870,641

[22] Filed: Jan. 19, 1978

[30] Foreign Application Priority Data

Jan. 21, 1977 [DE] Fed. Rep. of Germany ....... 2702360

[51] Int. Cl.$^2$ ............................................. B01J 27/32
[52] U.S. Cl. .................................. 252/415; 260/653.7
[58] Field of Search ................... 252/411 R, 415, 441; 260/653.7

[56] References Cited

U.S. PATENT DOCUMENTS

| | | | |
|---|---|---|---|
| 2,505,877 | 5/1950 | Benning | 252/441 |
| 3,385,794 | 5/1968 | Sherer et al. | 252/415 |
| 3,660,307 | 5/1972 | Sherer et al. | 252/415 |

Primary Examiner—Winston A. Douglas
Assistant Examiner—P. E. Konopka
Attorney, Agent, or Firm—Curtis, Morris & Safford

[57] ABSTRACT

Chromoxyfluoride catalysts which are used for converting chlorocarbons with hydrogen fluoride into fluorochlorocarbons lose a part of their activity over a period of time. Reactivation of the catalysts occurs upon treatment with fluorine at temperatures of from 70 to 300° C.

5 Claims, No Drawings

PROCESS FOR REACTIVATING FLUORINATION CATALYSTS

Fluorination catalysts belonging to the group of chromoxyfluorides obtainable, for example, by fluorination of hydrated chromic oxides with hydrogen fluoride (cf. German Auslegeschrift No. 1,252,182) or by heating water-containing chromic trifluoride in the presence of oxygen (cf. U.S. Pat. No. 2,745,886) are excellently suitable for the fluorination of chlorinated and/or brominated aliphatic hydrocarbons in the gaseous phase. These catalysts, however, have the disadvantage that their exchange activity gradually decreases and that the amount of hydrogen fluoride required to reactivate them increase, when they are contacted for a prolonged period of time with halogen-containing carbon compounds, especially those which contain in addition hydrogen and/or oxygen.

It is already known that catalysts of said type may be reactivated by treating them with oxygen at a temperature of about 500° C., this measure, however, being efficient only for a short period of time.

Said catalysts have furthermore been treated with elementary chlorine at a temperature of from 200 to 500° C. (cf. German Pat. No. 1,194,826). These reactivation processes are generally carried out at a temperature of about 300° C., higher temperatures of at least 400° C. being required, when the catalysts ar damaged to a considerable extent.

It is further known from German Pat. No. 1,767,200 to use hydrogen fluoride for the regeneration of fluorination catalysts belonging to the group of the chromoxyfluorides, at a temperature of from 100 to 600° C. It has become manifest, however, that these regeneration processes cannot prevent a gradual deactivation of the catalysts. Thus the above-mentioned chlorination process is additionally required.

Experience has shown that hydrogen fluoride regeneration processes, when applied to catalysts which have been used for a very extended period of time, do not lead to the desired result. Similarly reactivation can be performed only with difficulty when using chlorine. For example considerably increased temperatures are required and large amounts of chlorine have to be added. Owing to the relatively high temperatures required during the hitherto used reactivation by means of chlorine, the catalyst material must be transferred from the steel reactors which are conventional for use for the fluorination of chlorinated hydrocarbons with hydrogen fluoride, to suitable chlorine-resistant reactors, for example reactors made of nickel. This procedure is costly, time-consuming and involves a considerable expenditure of energy and material. Thus the apparatus in the involved part of the fluorination plant must be shut down and cooled, the reactivation reactor must be heated and cooled in a complicated manner and the freshly charged fluorination reactor must be heated again. Furthermore, losses in catalyst may occur during charging and discharging of the reactor.

It is therefore an object of the present invention to provide an improved process for the reactivation of used, slightly or highly deactivated chromoxyfluoride catalysts.

The problem of reactivating a fluorination catalyst belonging to the chromoxyfluoride group is solved by treating the catalyst with elementary fluorine at a temperature of from 70° to 300° C.

The process according to the invention is carried out in accordance with conventional catalytic gas-solid reactions, by passing gaseous fluorine in diluted or pure form through a heatable reactor tube charged with the solid catalyst material, the tube consisting of a material sufficiently resistant to fluorine and hydrogen fluoride, for example nickel, steel, copper, or platinum or being lined, for example with polytetrafluoroethylene.

The reaction is carried out at a temperature of from 70° to 300° C., preferably of from 90° to 250° C., especially of from 150° to 210° C.

The fluorine used in the process of the invention is advantageously diluted with an inert gas and/or anhydrous hydrogen fluoride.

The process is preferably carried out under anhydrous conditions.

The feed rate of fluorine is not critical and is generally in the range of from 0.01 to 5.0 l/h, preferably of from 0.1 and 2.0 l/h per liter of the material contacted. The upper limit of the total quantity of fluorine introduced is not critical either, since damage to the catalyst material as a consequence of treatment with a quantity of fluorine surpassing said limits could not be detected in subsequent Cl/F exchange tests and in the HF requirement obtained. For economical reasons the fluorine feed should be discontinued soon after the first positive tests for fluorine at the gas outlet tube of the reactor are obtained. These tests may be carried out for example with paper test strips impregnated with potasium iodide.

The feed of the inert gas, for example nitrogen, argon, helium or tetrafluoromethane is not critical. The use of an inert gas certainly may be dispensed with, but it has the advantage that unwanted high temperature peaks are eliminated when the fluorine stream is diluted. The feed rate of inert gas per liter of contact material is in the range of from 0 to 10 l/h, preferably of from 0.3 to 3.0 l/h. The total quantity of inert gas passed through is not critical either. However, it is maintained at a low level for economical reasons.

Adding hydrogen fluoride, advantageously in anhydrous form, is not necessary, but suitable. The feed rate per liter of contact material of the gaseous hydrogen fluoride is in the range of from 0 to 200 g/h, preferably of from 5 to 50 g/h. The total quantity of hydrogen fluoride passed through is not critical. Hydrogen fluoride which has been passed over the catalyst may be subsequently condensed and/or be used for further fluorination reactions.

The reactivation time according to the process of the invention depends on the previous history and especially on the degree of deactivation of the chromoxyfluoride catalyst, on the added quantity of fluorine and on the temperatures employed (refer to the examples). It is generally in the range of from 3 to 60 hours. Longer reactivation times are possible, but do not bring about a technical advantage. The efficiency of the reactivation has been tested and been proved by tests of long duration (refer to Example 5).

The process according to the invention is carried out under normal pressure, but excess pressures may be applied within wide limits. Thus it may be operated under a pressure of from 1 to 10 bars or more, preferably of from 1 to 3 bars. Fluorinations carried out on an industrial scale should be performed in continuous and uniform manner. The process according to the invention enables reactivations by means of hydrogen fluoride to be carried out during the regeneration phases which are usual in technical processes.

It is surprising that no detectable damage due to the treatment with elementary fluorine can be found in the catalyst material, while the values of the exchange activity (chlorine for fluorine) and the hydrogen fluoride conversion are distinctly and enduringly improved. A particular advantage is furthermore that the temperatures which have to be used for an efficient reactivation of highly damaged catalysts are unexpectedly low in comparison with temperatures of the prior art.

The process according to the invention represents a considerable technical progress, as it replaces the hitherto used reactivation of chromoxyfluoride catalysts with chlorine and since it can be carried out in steel reactors of the type which are used for the preparation of fluorinated chlorinated hydrocarbons. The reactants of the present invention enable the process of the invention to be combined with the hitherto known regeneration using hydrogen fluoride. The technical progress moreover resides in the fact that it enables even highly deactivated catalysts, which could be activated only with difficulty hitherto, to be reactivated economically and be used again in the industry, with a low expenditure of material and energy. Thus the life of highly damaged catalysts and of those damaged to a lower extent, which belong to the group of chromoxyfluorides, may be considerably prolonged to an extent far beyond the results hitherto achieved. These catalysts are valuable agents and can be used in a wide field of application.

The catalysts to be activated by the process of the invenzion consist of chromium, oxygen and fluorine (in addition to small quantities of organic poisons) and are non-volatile solid substances at temperatures of from 70° to 300° C. Catalysts in which the molar ratio of Cr:F is in the range of from 1:1 to 1:2 and that of Cr:O is of from 1:1 to 1:2 are especially appropriate.

The following examples illustrate the invention:

EXAMPLE 1

The test apparatus for the reactivation of chromoxyfluoride catalysts with elementary fluorine was composed of a vertically arranged nickel tube of 150 cm length and of 5 cm diameter. The reactor tube was heated by a jacket. Inside of the nickel tube a VA-steel tube having an outer diameter of 0.6 cm, an inner diameter of 0.4 cm and a length of 145 cm, into which a thermoelement can be introduced at any desired level of the reactor for measuring the inner temperature, was arranged axially. A sieve disposed in the reactor tube served for retaining the granulated catalyst material at the desired level of the tube. At the bottom of the reactor was arranged a separately heatable evaporator made of nickel, into which opened the tubes for hydrogen fluoride (gaseous), diluted or un-diluted gaseous fluorine or for chlorinated hydrocarbons (liquid). The temperature in the evaporator was maintained at a level between the boiling point of the feed chlorohydrocarbons and the reactor temperature. From the top of the nickel reactor a tube led to a washer containing water, where the hydrogen halide containing mixtures resulting from the fluorination of chlorocarbons were washed. The acid aqueous solutions thus formed were later titrated. In reactivation procedures fluorine tests are carried out at the gas outlet tube (for example by means of potassium iodide strips) and the washer is omitted.

The process of the invention was carried out in the following manner: elementary fluorine ($F_2$) was taken out of a commercial steel cylinder, measured by means of a previously gauged differential pressure flow meter and passed to the reactor in un-diluted form or after having been diluted with nitrogen or another inert gas. Ahead of the fluorine flow meter there was arranged a rising tube manometer for observing the dynamic pressure established, with the tube serving simultaneously as a safety valve. The dynamic pressure meters were changed with perfluorinated polyether oils, the ground joints were tightened with a fat based on polytrifluorochloroethylene.

Commercial grade hydrogen fluoride (HF) of more than 99% purity was metered in by means of a measuring device analogous in principle to that for the fluorine feed. The device contained additionally heating elements to prevent a condensation of HF in the tubes to the evaporator.

Carbon tetrachloride ($CCl_4$) and optionally methylene chloride ($CH_2Cl_2$) were used in technically pure form. They had been dried over calcium chloride. The chlorinated hydrocarbons were weighed continuously on a balance, metered in through flexible tube pumps and converted into the gaseous phase in the evaporator at 110° to 120° C.

330 ml (bulk volume) of a chromoxyfluoride catalyst which had been prepared by fluorinating hydrated chromic oxide (Guignet's green) and which had been used in the industrial fluorination of carbon tetrachloride were introduced into the reactor tube.

A chlorine-fluorine-exchange test was performed at 300° C. for 3 hours by passing 60 g/h of HF and 95 g/h of $CCl_4$ (molar ratio of HF:$CCl_4$ of 3.0:0.62) over this catalyst. Titration of the collected HCl showed a chlorine-fluorine-exchange value of 2.63, which means that of 4 chlorine atoms in $CCl_4$ 2.63 chlorine atoms are exchanged on the average for fluorine atoms.

In a subsequently performed hydrogen fluoride-conversion test which was performed in analogous manner at 200° C. for 3 hours using 40 g/h of HF and 190 g/h of $CCl_4$ (molar ratio of HF:$CCl_4$ of 2.0:1.24) the hydrogen fluoride conversion determined by titration of the collected HCl and HF amounted to 96.5% of the feed quantity of HF.

Thereafter a gas mixture consisting of 0.3 l/h of fluorine, 0.5 l/h of nitrogen and 10 g/h of hydrogen fluoride was passed over the tested catalyst at an internal temperature of 95° C. for 5 hours. The following values, determined in the above-described manner were obtained.

HF conversion: 98.4% of the theory Cl/F exchange: 2.95.

EXAMPLE 2

Example 1 was repeated, with the exception that the catalyst material was treated with a gas mixture of 0.15 l/h of $F_2$, 0.5 l/h of $N_2$ and 5 g/h of HF at an internal temperature of 190° C. for 10 hours. The following activity values were determined:

HF conversion: 99.4% of the theory Cl/F exchange: 3.33.

The HF conversion values were determined in all examples by titration, after absorption of the gases in water. Values of more than 98% of the theory were in addition checked by potentiometric titration, with a fluoride-specific, repeatedly gauged electrode.

EXAMPLE 3

The catalyst obtained and reactivated in Example 2 was tested in the same apparatus as in Example 1 for determining its stability to an excess fluorine treatment in the following manner:

A gas mixture consisting of 0.15 l/h of $F_2$, 0.5 l/h of $N_2$ and 10 g/h of HF was passed over the catalyst at an internal temperature of 180° C. for 74 hours. The following activity values were found:

HF conversion: 99.5% of the theory Cl/F exchange: 3.35.

EXAMPLE 4

The apparatus of Example 1 was charged again with the chromoxyfluoride catalyst (bulk volume 330 ml; starting material the same as in Example 1). At an internal temperature of 180° C. a gas mixture of 0.6 l/h of $F_2$, 0.8 l/h of $N_2$ and 10 g/h of HF was passed through the reactor zone for 3 hours. The following activity values were found:

HF conversion: 99.3% of the theory Cl/F exchange: 3.25.

EXAMPLE 5

The catalyst reactivated in Example 4 was reacted in the same apparatus as in Example 1 with carbon tetrachloride (rate 190 l/h) and hydrogen fluoride (rate 40 g/h) for 160 hours without further treating it with fluorine. The following values for the HF conversion were found:

HF conversion after 51 working hours: 99.4% of the theory

HF conversion after 114 working hours: 99.2% of the theory

HF conversion after 160 working hours: 99.3% of the theory

EXAMPLE 6

The catalyst obtained and tested in Example 5 was submitted to a damaging treatment with methylene chloride in the same apparatus as in Example 1. After having passed $CH_2Cl_2$ (rate 150 g/h) and HF (30 g/h) at 165° C. for 17 hours, a HF conversion of 97.0% of the theory was determined.

Subsequently the catalyst was reactivated at 170° C. for 6 hours with a gas mixture consisting of 0.2 l/h of $F_2$, 0.6 l/h of $N_2$ and 10 g/h of HF. The following activity values were determined:

HF conversion: 99.5% of the theory Cl/F exchange: 3.28.

EXAMPLE 7

Example 1 was repeated, but the catalyst was treated with a gas mixture consisting of 0.15 l/h of $F_2$, 0.5 l/h of $N_2$ and 10 g/h of HF at an internal temperature of 225° C. for a period of 6.5 hours.

The activity values found were as follows:

HF conversion: 99.1% of the theory Cl/F exchange: 3.30

EXAMPLE 8

The chromoxyfluoride catalyst (bulk volume 330 ml; starting material the same as in Example 1) was introduced into the test apparatus of Example 1 and treated with a gas mixture of 0.3 l/h of $F_2$, 0.5 l/h of $N_2$ and 10 g/h of HF at an internal temperature of 310° C. for 18 hours. Upon treating the catalyst with this high quantity of fluorine at a relatively elevated temperature, the following activity values were found:

HF conversion: 98.3% of the theory Cl/F exchange: 3.02.

In this test, the catalyst had changed its color from green to greenish brown. This was not observed in the other examples.

EXAMPLE 9

To the reactor used in Example 1 were fed 330 ml of another catalyst based on chromoxyfluoride which had been used in industry for the fluorination of $CCl_4$.

The following activity values were found when the catalyst was tested:

HF conversion: 18.5% of the theory Cl/F exchange: 1.67.

After treating the catalyst with HF (rate 20 g/h) for 40 hours at 180° C. an improved value for HF-conversion of 73.5% of the theory was found in a subsequent test (according to Example 1).

The HF conversion could be further improved to a value of 75.2% of the theory by a further immediately following treatment of the catalyst with HF (rate 20 g/h) for 65 hours at 180° C.

Thereafter the catalyst was reactivated for 8 hours at 165° C. with a gas mixture of 1.1 l/h of $F_2$, 1.5 l/h of $N_2$ and 25 g/h of HF at an internal temperature of 165° C. During the reactivation a temperature increase in the reactor reaction zone of about 3° C. was observed. The following activity values were measured:

HF conversion: 97.8% of the theory Cl/F exchange: 2.82.

EXAMPLE 10

Example 9 was repeated using 2500 ml of the same catalyst. Upon treating the catalyst for 105 hours with HF (rate 20 g/h) at 180° C., the HF-conversion found was 75.8% of the theory. Subsequently the catalyst was reactivated for 44.5 hours at 190° C. with a gas mixture consisting of 0.6 l/h of $F_2$, 0.6 l/h of $N_2$ and 10 g/h of HF. At the same time a transitory temperature increase of from 2° to 3° C. in a reaction zone migrating upwards in the reactor was observed. A value for the HF conversion of 98.9% of the theory was measured.

What is claimed is:

1. A process for reactivating a chromoxyfluoride fluorination catalyst which comprises treating the catalyst with elementary fluorine at a temperature of from 70° to 300° C.

2. A process according to claim 1 wherein the fluorine is diluted with inert gas.

3. A process according to claim 1 wherein the fluorine is diluted with anhydrous hydrogen fluoride.

4. A process according to claim 1 wherein the reaction is carried out at a temperature of 150° to 210° C.

5. A process according to claim 1 wherein the fluorine feed rate is from 0.01 to 5.0 liters per hour per liter of catalyst.